United States Patent
Boodaghians et al.

(10) Patent No.: US 9,376,333 B2
(45) Date of Patent: Jun. 28, 2016

(54) INLINE UV LED WATER DISINFECTION AND HEATING

(71) Applicant: MAG AEROSPACE INDUSTRIES, INC., Carson, CA (US)

(72) Inventors: Razmik Boodaghians, Glendale, CA (US); Jeff Lassegard, Aliso Viejo, CA (US); Nguyen Tram, Chino Hills, CA (US); Christina Ortolan, Long Beach, CA (US); Vikram Chauhan, Redondo Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 13/707,808

(22) Filed: Dec. 7, 2012

(65) Prior Publication Data
US 2013/0146783 A1    Jun. 13, 2013

Related U.S. Application Data

(60) Provisional application No. 61/568,972, filed on Dec. 9, 2011.

(51) Int. Cl.
*G01N 23/00* (2006.01)
*C02F 1/32* (2006.01)

(52) U.S. Cl.
CPC .......... *C02F 1/325* (2013.01); *C02F 2201/001* (2013.01); *C02F 2201/3222* (2013.01); *C02F 2201/3227* (2013.01); *C02F 2303/04* (2013.01); *C02F 2307/14* (2013.01); *Y02W 10/37* (2015.05)

(58) Field of Classification Search
CPC .......... C02F 2201/32; C02F 2201/322; C02F 2201/3221; C02F 2201/3222; C02F 2201/326; C02F 2201/328
USPC .......................................... 250/455.11, 492.1
See application file for complete search history.

(56) References Cited

U.S. PATENT DOCUMENTS

| | | | |
|---|---|---|---|
| 4,184,076 A * | 1/1980 | Kosnoff | C02F 1/325 250/436 |
| 4,871,452 A | 10/1989 | Kohler et al. | |
| 5,478,479 A * | 12/1995 | Herrig | 210/745 |
| 5,501,801 A | 3/1996 | Zhang et al. | |

(Continued)

FOREIGN PATENT DOCUMENTS

| EP | 1795503 A1 | 6/2007 |
|---|---|---|
| EP | 2047870 A1 | 4/2009 |

OTHER PUBLICATIONS

International Search Report and Written Opinion dated Mar. 21, 2013 in Application No. PCT/US2012/068373.

(Continued)

*Primary Examiner* — Nicole Ippolito
*Assistant Examiner* — Jason McCormack
(74) *Attorney, Agent, or Firm* — Kilpatrick Townsend & Stockton LLP; Dean W. Russell; Kristin M. Crall

(57) ABSTRACT

Embodiments of the present invention relate generally to on-aircraft potable water disinfection with UV LED light sources that are positioned in-line with the water delivery system. Further embodiments relate to using the scavenged heat generated by the LEDs to deliver heat back to the water supply tube for temperature stabilization and to prevent water freezing.

14 Claims, 9 Drawing Sheets

(56) References Cited

U.S. PATENT DOCUMENTS

| | | | |
|---|---|---|---|
| 5,933,702 A | 8/1999 | Goswami | |
| 5,982,969 A * | 11/1999 | Sugiyama | B60Q 1/26 362/554 |
| 6,143,185 A | 11/2000 | Tracy et al. | |
| 6,238,631 B1 | 5/2001 | Ogata et al. | |
| 6,558,639 B1 | 5/2003 | Watanabe et al. | |
| 7,927,554 B2 | 4/2011 | Morrow et al. | |
| 7,988,923 B2 | 8/2011 | Fink et al. | |
| 2003/0017073 A1 * | 1/2003 | Eckhardt | A61L 2/10 422/24 |
| 2006/0126338 A1 * | 6/2006 | Mighetto | 362/294 |
| 2006/0231770 A1 * | 10/2006 | Snowball | 250/432 R |
| 2007/0023670 A1 * | 2/2007 | Glover | G01N 21/274 250/373 |
| 2007/0131872 A1 * | 6/2007 | Shearer | C02F 1/325 250/435 |
| 2008/0106422 A1 * | 5/2008 | Sparks et al. | 340/573.6 |
| 2009/0208386 A1 * | 8/2009 | Barsky | C02F 1/30 422/186.3 |
| 2009/0250626 A1 * | 10/2009 | Schlesser et al. | 250/455.11 |
| 2009/0269240 A1 * | 10/2009 | Tanaka | C01B 13/11 422/24 |
| 2010/0224483 A1 * | 9/2010 | Cho | 204/222 |
| 2010/0237254 A1 * | 9/2010 | Mason | A61L 2/10 250/435 |
| 2011/0005620 A1 * | 1/2011 | Nevin | 137/560 |
| 2011/0226966 A1 * | 9/2011 | Takahashi et al. | 250/492.1 |
| 2011/0243789 A1 | 10/2011 | Roberts | |
| 2011/0278467 A1 * | 11/2011 | Tanaka | 250/372 |
| 2012/0051977 A1 * | 3/2012 | Boodaghians et al. | 422/117 |
| 2012/0068085 A1 * | 3/2012 | Cucin | A61B 10/0275 250/492.1 |

OTHER PUBLICATIONS

Flexible LED Mat Can Bend and Fold for Any Emergency Lighting Situations 3 pages (2010) http://gizmodo.com/5684510/fiexible-led-mat-can-bend-and-fold-for-any-emergency-lighting.com Accessed Apr. 15, 2013.

PCT/US2012/068373, International Preliminary Report on Patentability dated Jun. 19, 2014, 5 pages.

* cited by examiner

INLINE UV LED WATER DISINFECTION AND HEATING

CROSS REFERENCE TO RELATED APPLICATIONS

This application claims the benefit of U.S. Provisional Application Ser. No. 61/568,972, filed Dec. 9, 2011, titled "Inline UV LED Water Disinfection and Heating," the entire contents of which are hereby incorporated by reference.

FIELD OF THE INVENTION

Embodiments of the present invention relate generally to on-aircraft potable water disinfection with UV LED light sources that are positioned in-line with the water delivery system. Further embodiments relate to using the scavenged heat generated by the LEDs to deliver heat back to the water supply tube for temperature stabilization and to prevent water freezing.

BACKGROUND

Disinfection of the potable water supply onboard transportation vehicles is needed to guarantee the water quality that is uploaded to the vehicle tanks, particularly from international water sources. Water systems on aircraft especially, are complicated systems that usually include a tank with manifolds plumbing, and a pressurization system to deliver the water to the points of use. There are a number of reasons why clean and/or potable water is needed on-board a vehicle, such as an aircraft. For example, clean water is needed for handwashing in the lavatory sinks, and potable water is needed for use to brew coffee or deliver hot tea to passengers.

The issue of water quality, and in particular, of potable water quality, on passenger transportation vehicles and equipment, such as aircraft, trains, boats and ships, and the like is becoming more of a concern to regulatory authorities. This is particularly true in the United States with respect to the potable water supplies contained aboard commercial aircraft. Regulatory standards have been enacted that require water on board passenger vehicles to be disinfected according to certain standards. Passenger airlines must thus implement appropriate aircraft water disinfection protocols.

U.S. Pat. No. 4,871,452 to Kohler, et al., entitled "On-Board Water Supply," discloses equipment for purifying waste water from galleys, sinks, and toilets of aircraft. Waste water from these areas discharges to a tank, after which it passes through a mechanical filter, a bed of active carbon, ozone and osmotic stages, and a disinfection stage involving addition of chlorine and irradiation with ultraviolet ("UV") light. Thereafter, the water is made available to aircraft passengers for certain uses.

U.S. Pat. No. 6,143,185 to Tracy, et al. entitled "Treatment System for Aircraft Toilet Waster Water" discloses alternate systems for decontaminating waste water from aircraft toilets, sinks, and galleys. They too include a mechanical particulate filter, activated carbon, and a source of UV light. Alternatively, according to the Tracy patent, the waste water may be exposed to microwaves or treated with chlorine or iodine. A sensor may be used to measure "the level of clarity of the treated water as an indication of its purity" and restrict opening of a control valve until acceptable clarity levels are obtained.

However, these systems and methods are primarily directed at purifying wastewater removed from the aircraft. Airlines and other passenger transport vehicle companies must also ensure that the potable water (i.e., drinkable water) aboard the aircraft is fit for human consumption by employing appropriate disinfection protocols. But disinfection upon upload and periodic disinfection sampling does not always adequately address the issue of contamination introduced in uploaded water, which is of particular concern for aircraft flying to and from, and being serviced in, non-industrialized areas. In addition, air must be introduced into the water storage and dispensing system on the aircraft in order to maintain pressurization, as well as to drain the system during routine servicing. This air can introduce pathogens that can multiply and cause unsanitary conditions and unacceptable water quality in the intervals between samplings or disinfection procedures. In effect, because the water storage and dispensing system is routinely exposed to the outside environment, potable water quality cannot always be ensured without some form of additional treatment.

Ultraviolet treatment eliminates bacteria, viruses, spores and mold in the water and works similar to the way that strong sunlight can permanently purify water by making biological impurities inactive. Ultraviolet lamps are generally designed to destroy the links in these micro-organisms' DNA so that they are de-activated and cannot reproduce. The crucial hydrogen bonds that link the DNA chain together rupture when exposed to light between the wavelengths of about 220 nm to about 310 nm. As discussed above, UV water treatment has been used in many water purification circumstances, including on-board passenger transport vehicles such as aircraft, in order to treat and purify the water circulating on-board.

There are currently a number of water treatment solutions being employed and/or studied for use on-board aircraft. For example, one way that water can be treated is via UV mercury lamps. These lamps deliver an ultraviolet light to the water in the system and have been found beneficial because the treatment does not change the taste or odor of the water, it kills bacteria, viruses and protozoan, it is compact and easy to use, and it can prevent biofilm if the system is kept clean. However, one of the disadvantages of mercury UV lamps for water treatment is that they require a medium to high electrical demand, which means that when used on-board a vehicle such as an aircraft, they pull electrical power from the aircraft engines and/or an auxiliary power unit (APU). Increased usage of aircraft power from the engines results in higher fuel consumption and costs. Other disadvantages are that UV mercury lamps require cleaning and new lamps annually, and if a mercury lamp is broken, there exists a chance for mercury contamination of the water to be treated. Additionally, UV lamps take a while to power on if not in constant use.

Another method of water treatment has been to use UV light with photo-catalytic agents. In addition to the above benefits, this treatment may require less power than the UV lamp alone and it may be used with other UV sources, although it may impede or otherwise slow the flow of water through a reaction chamber. Some of the materials related to the use of photo-catalytic agents are EP2047870, which uses mercury lamps and photo-catalyst-coated chamber walls. These walls incorporate a sequence of cone shapes protruding from the cylinder interior of the chamber walls. The cones are coated with a photo-catalyst (normally titanium-dioxide at which point the reactive species of hydroxyl and superoxide are created to kill pathogens), and the cone shapes are intended to slow the flow of the water (essentially creating turbulence) and increase the surface area of the reactions where oxidative species are created. Another related attempt is described in U.S. Pat. No. 6,238,631, which uses a mesh-type arrangement where the water becomes trapped while moving and is in contact with the catalysts and a spiral, in which the water is forced to rotate around a blade-like arrangement in order to exit the tube. Other related photocatalyst treatment documents are U.S. Pat. Nos. 5,933,702; 5,501,801; 6,558,639; 7,988,923; and 7,927,554.

A further method of water treatment that has been explored is the use of UV LED (light emitting diode) light for water treatment. In addition to the mercury lamp benefits, the use of UV LED light also has the advantage of being able to use a wider UV band with multiple LED wavelengths, can offer a high power output with less power consumption than UV lamps, UV LEDs have greater longevity, power up quickly without requiring a delay time built into the system for the UV light source to reach its optimum UV energy output, and do not contain mercury. Some companies have been manufacturing UV lamps and LED systems for water sanitation and disinfection, but none of the available systems are designed for use on-board a transportation vehicle or an aircraft. For example, some systems are being developed and investigated for use in treating city-scale water by companies such as Trojan Technologies and Sterilite. However, most of these proposed technologies use outdated UV lamp designs as opposed to LEDs. Aquionics is a company that provides a UV LED system called the UV-Pearl™. This system provides a separate unit, which can be integrated into a water line system or used as a stand-alone unit. However, this system is not an inline system that is incorporated into the actual water supply line. Instead, it is a stand-alone unit that is incorporated into a break in the line, and thus does not become a part of the actual water line itself. It is not truly "in line" with the water supply line.

For existing aircraft, retrofitting a UV disinfection device can be costly, space prohibitive, and require extra wiring (power and operating status), extra plumbing, and the resulting systems may be unable to operate at the proper level of initial designed performance. Other incarnations have used UV purification units at aircraft water upload on the ground, but that too must be a fully-integrated device at the system level. There is also a need to further disinfect the water once it has been circulating in the aircraft water pipe system for a period of time, as the water may also need to be treated on an on-going basis, particularly as it is being delivered to the point of use.

Therefore, a current need exists for a UV LED system for use in a vehicle or aircraft environment that is space efficient, energy efficient, accessible, and that is located in close proximity to a power supply and a water-system plumbing. It is also desirable to provide a system that can be added to existing systems, as opposed to having to replace the entire plumbing system on the vehicle.

BRIEF SUMMARY

Embodiments of the invention described herein thus provide systems for disinfection of the potable water supply on-board transportation vehicles in a compact and retrofit-capable manner. To accomplish this, an inline UV LED water treatment unit may be integrated into an architecture that is similar to a supply tube already in the water delivery system. In one embodiment, the water supply-tube doubles as a UV chamber. In another embodiment, a water supply treatment side module is located on the water supply tube.

DETAILED DESCRIPTION

Embodiments of the present invention provide the use of UV LEDs (light emitting diodes) in order to treat water that is circulating on-board a passenger transport vehicle. The systems described allow an existing water line tube or supply line to be retrofit with a tube containing UV LEDs for water treatment along that portion of the water supply line. Alternatively, embodiments provide a new way to design a water line tube so that the water traveling therein can be treated. These designs allow the water line itself to form an inline treatment chamber. The diodes may be arranged in any array, such as radially and/or longitudinally. They can then be embedded or molded into the wall of the chamber (water line tube), they may be provided as a composite, or inserted into holes in a metallic chamber.

Figure 1:
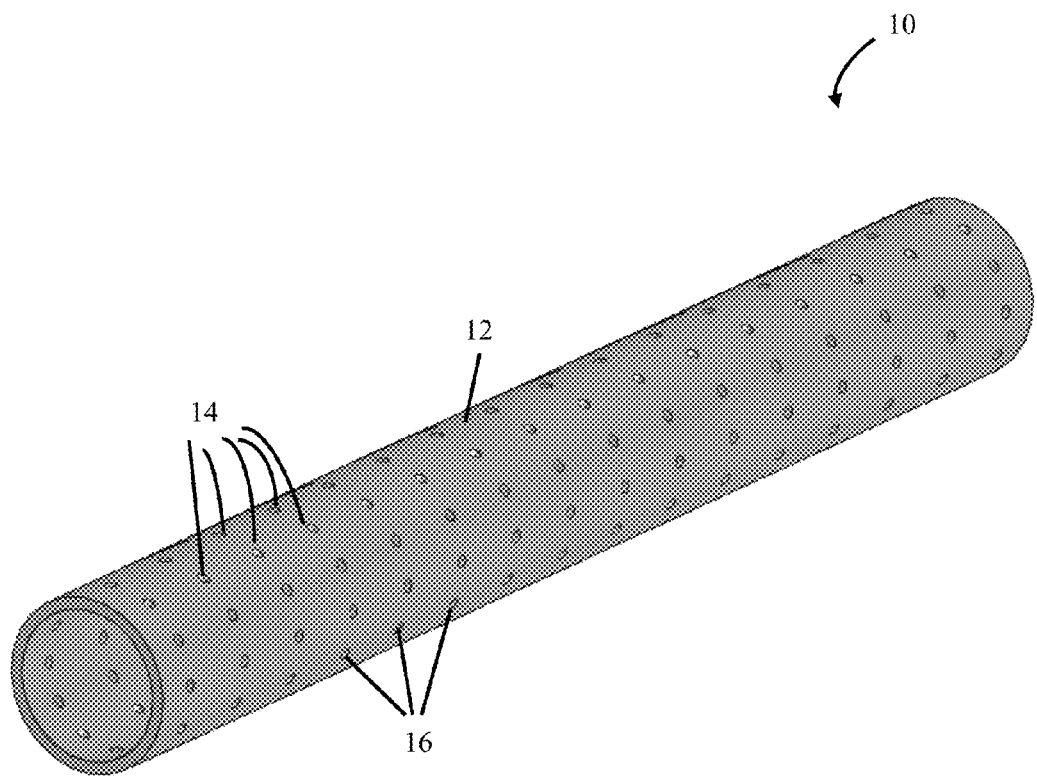
FIG. 1 shows a side perspective view of one embodiment of a water line that functions as an inline chamber with locations for UV LEDs to be inserted.
Figure 2:
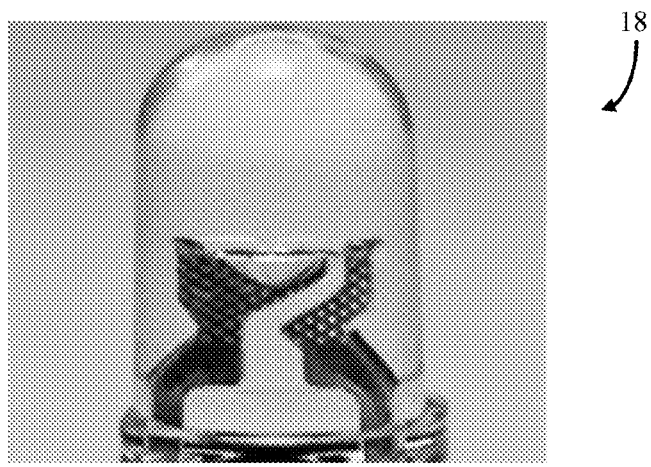
FIG. 2 shows an exemplary UV LED that may be positioned in one of the locations of FIG. 1.
Figure 3A:
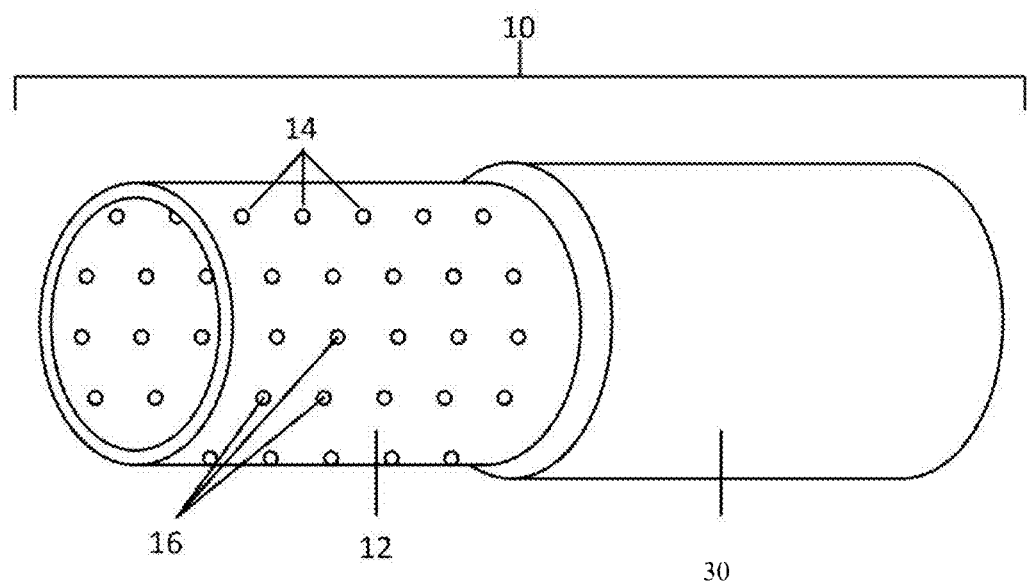
FIGS. 3A and 3B show the water line of FIG. 1 with a sheath.
Figure 3B:
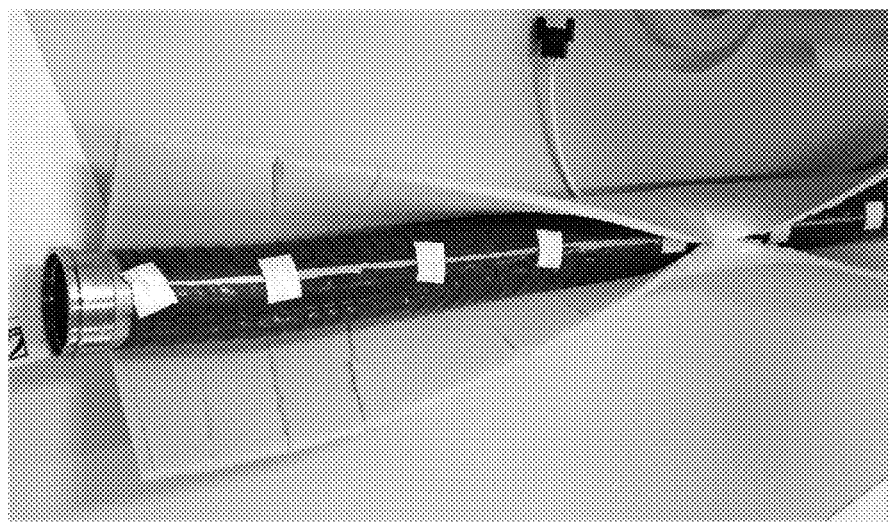

FIG. 1 shows an isometric view of an inline ultraviolet water treatment chamber 10. The chamber 10 is provided by a section of a water line tube 12 with locations 14 for UV LED's to be inserted. The locations 14 in FIG. 1 are shown as openings 16 in the water line tube 12. One or more UV LEDs 18 (one example of which is shown in FIG. 2) may be inserted into the tube 12. In this embodiment, the tube 12 may be covered with a sheath 30 for heat retention purposes. For example, the sheath 30 may be a sheath or blanket that is made of a heat resistant or fire resistant material such as silicon or a heat shrink polymer. As shown in FIGS. 3A and 3B, sheath 30 may be positioned over the tube 12 to insulate and retain the heat energy produced by the LEDs. The excess heat put off by the LED's will also act to keep the tube warm and the water from freezing. The insulating wrapper prevents the heat from escaping to the atmosphere and can channel the heat back to the tube to warm the pipe. (Currently on aircraft, electricity is supplied to warm the water supply line pipes and to prevent their freezing. The electricity is pulled from the aircraft engine, which is an undesirable drain on the aircraft power that can be solved by implementation of the embodiments described herein.) These figures show just examples of potential sheaths 30, however, it should be understood that the sheath or blanket may be any design or any appropriate thickness such that it provides the desired heat retention.

Referring now to the securement of the UV LEDs into the openings 16, the LEDs may be adhesively secured in place in the openings 16 with a heat resistant adhesive, mechanically secured via a screw and thread configuration, soldered in place, provided on a fitting, positioned on a background or plate that is positioned around the tube 12 such that the UV LEDS can shine through openings, or any other appropriate possible securement method that allows the UV LED to cooperate with and emit light through the opening 16. They are generally secured in such a way that renders them water-tight or otherwise sealed. For example, the LED seals should generally be able to withstand about 40 psi under normal operation, 120 psi proof pressure, and 180 psi burst pressure.

One of the benefits of this system is that it allows the UV LEDs to be modular, such that if one burns out, it may be replaced without disrupting the others. The openings 16 are shown as circular openings, but it should be understood that openings 16 may be any appropriate shape and size. A single UV LED may be positioned per opening or more than one LED may be positioned in a single opening. There may be any number of UV LEDs positioned in locations 14, and they may be intermittently positioned or in a regular pattern around the tube 12.

Alternatively, one or more UV LEDs may be embedded or molded within the walls of tube 12. In this embodiment, the UV LEDs may not be as modular and the heat may not be as easily captured, but this configuration may be otherwise desirable in some instances.

In either of these options, the tube 12 may be formed as a part of the water supply line itself, provided as an internal insert into the center of the line, or provided as a sheath that may be positioned outside a transparent water line (so that the UV LED light can penetrate through the tube 12 and the water line to deliver the treatment).

Figure 4:
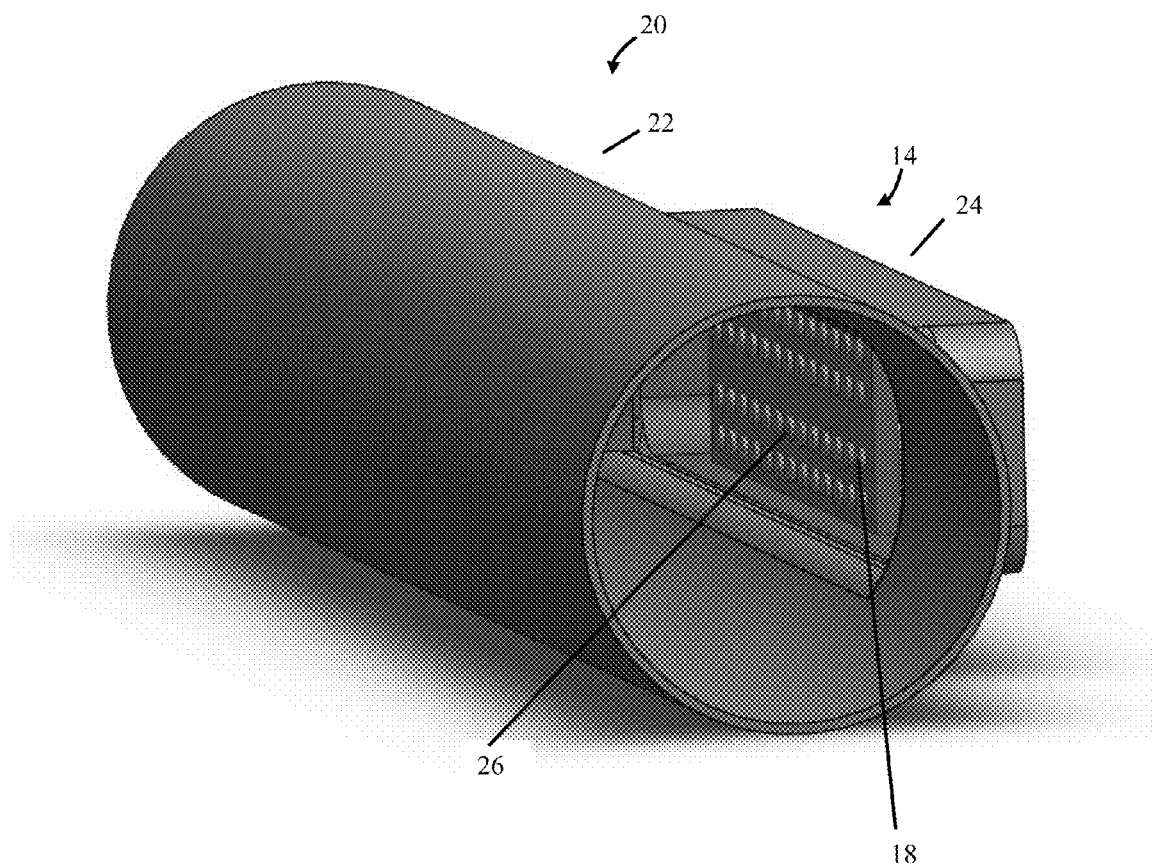
FIG. 4 shows an alternate embodiment of a water line tube with a water treatment module.

FIG. 4 shows an alternate inline chamber 20 that includes a water line tube 22 with a side module 24 housing one or more UV LEDs 18. In one embodiment, the UV LEDs may be arranged on a UV LED flat-plate array 26 in the side module 24 on the chamber 20. These are the LED locations 14, which are particularly located in the module in this instance. Although the module 24 is shown as housing a flat-plate array in the shape of a rectangular-like box is shown, it should be understood that the module 24 and the array 26 may take any shape, such as a curved outer module, an oblong module, a circular bubble-shaped protrusion/module, or any other appropriate shape.

The water flowing through the tube 22 is subjected to the treatment as it passes by the side module 24. The array 26 may be provided as any appropriate calculated length segment, designed for proper UV disinfection efficacy. There may be more than one module 24 per tube 22, and there may be more than one array 26 per module 24. The number and positioning of the modules 24 and arrays 26 is calculated based on the speed of water passage, the amount of UV light to be emitted for treatment, the thickness of the tube, and many other considerations.

Figure 5:
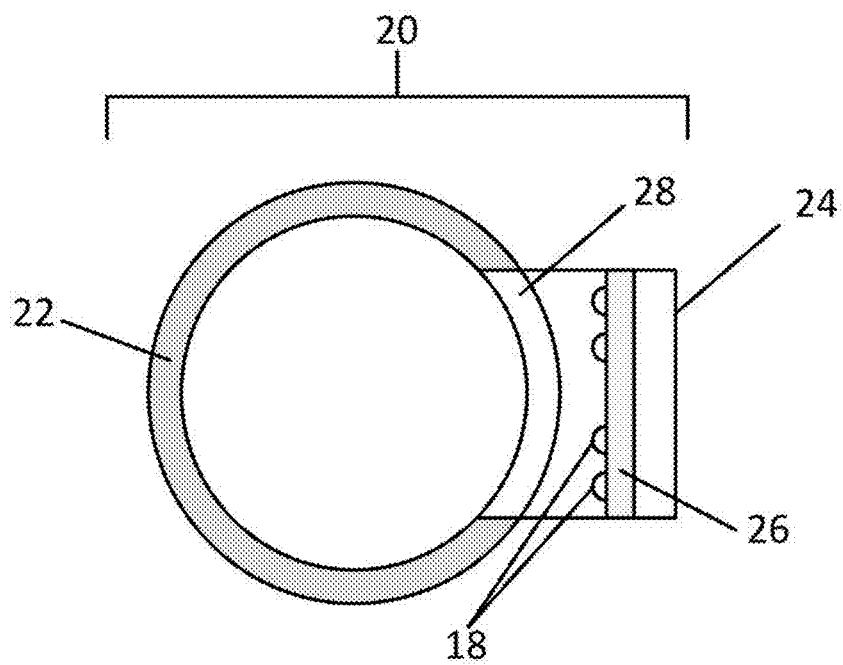
FIG. 5 shows a cross sectional view of the water line tube of FIG. 4.

A quartz or polymer lens 28 may be provided over the array 26 to function as a barrier to the water flow. This lens will isolate the UV LEDs from the water flow, while allowing the UV light through. The lens 28 may be curved to be positioned to be generally inline with the water tube sides so that water is not caused to enter the side module or otherwise slow or disrupt the water flow. An example of this embodiment is shown in FIG. 5. Alternatively, the lens 28 may be positioned directly over the plate array 26, allowing some of the water to enter the space of the module 24. Rather than being curved as shown, it may be straight or it may be curved the other direction. It should be understood that the lens 28 may be any appropriate thickness or design.

The excess heat put off by the UV LED's may also be used to keep the tube warm and the water from freezing, as described above for the previous embodiment. An alternate heat scavenging method for with either embodiment may include ducting from the heat sink on the back of the UV LED board directly to the tube wall. A sheath blanket may be provided that wraps around the assembly in order to provide insulation.

Figure 6:
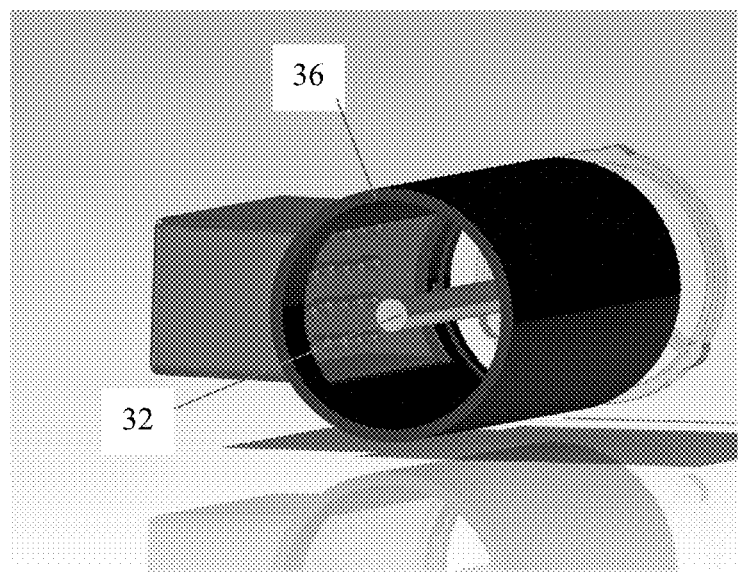
FIG. 6 shows an alternate embodiment of a water tube with a UV reflective rail member.
Figure 7A:
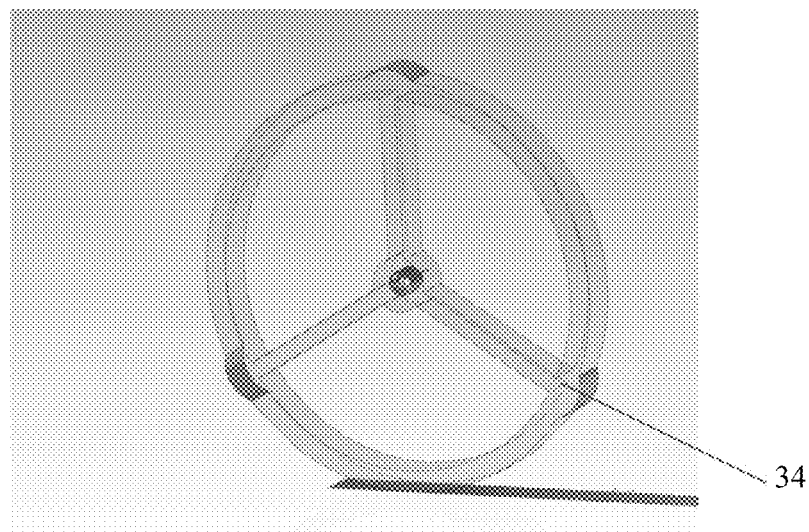
FIG. 7A shows a cross-sectional view of the embodiment of FIG. 6.
Figure 7B:
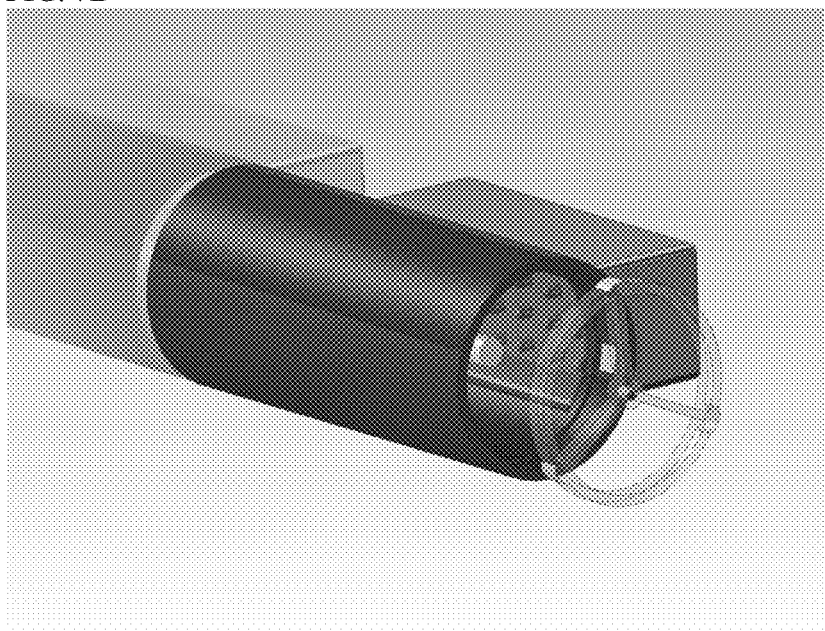
FIG. 7B shows an exploded view of the water tube of FIG. 6.

In any of the embodiments described, the interior of the tube may have all or a portion that features a reflective material, causing the wavelengths to be reflected back into the water for more effective water treatment. A further embodiment that provides enhanced reflective capabilities is shown and described in FIGS. 6 and 7A and 7B. This embodiment provides a UV reflective rail member 32 running along the interior of the tube 12 or 22, generally in the center, although not necessarily. Member 32 may be positioned by one or more support legs 34, which space member 32 a distance from the interior tube wall 36. Rail member 32 may feature one or more UV LEDs positioned thereon and/or it may simply be a reflector that causes the UV LEDs positioned in locations 14 to be reflected back into the water more effectively. The support legs 34 are provided in any pattern that allows the member 32 to be supported, without providing excessive water flow impedance or interfering with the laminar flow. This embodiment allows the UV LEDs to be on the inside of the tube, and can provide increased disinfection capability. By providing a UV reflective rail member in the interior of the tube, there is higher UV power in the center of the tube, which can help disinfect the water more effectively.

When the water passes through any of the water line tubes described, the water is disinfected. Either of the tube sections 12, 22 or member 32 may be inserted into an existing water supply line. For example, if a particular amount of water treatment is needed in a location along the supply line, then a portion of the traditional line may be removed and replaced with one of tube sections 12, 22. This would allow a system to be retrofit with the embodiments described herein, rather than having to replace an entire water supply line in order to implement this invention. Alternatively, the entire line may be formed from tube sections 12, 22, depending upon the water treatment need for that particular use/location. Alternatively, the tube 12 may be positioned inside a traditional water supply line.

One of ordinary skill in the art would understand how to optimize the water treatment using the disclosure provided herein. Providing varying numbers of modules 24/arrays 26 in tube(s) 22 or varying numbers of tubes 12 along the water supply line allows the system to be scalable and to have tube sections placed 12, 22 in locations that would best serve the individual aircraft and varying system layouts. The number of tube sections 12, 22 and consequently, the number of UV LEDs to be used is a function of the energy needed for the water treatment requirements to be met. One advantage of spacing the positions of tubes 12, 22 (and the corresponding UV LED locations 14) along the expanse of the water supply line is the ability to provide water treatment solutions along the entire water supply line, as opposed to all in one cluster (which is the effect of a water treatment module or system that is not positioned inline with the water supply). By spreading the tubes 12, 22 out along the water supply line, the water can be continuously bombarded with treatment at different locations along the line as it travels to the ultimate point of use.

Figure 8:
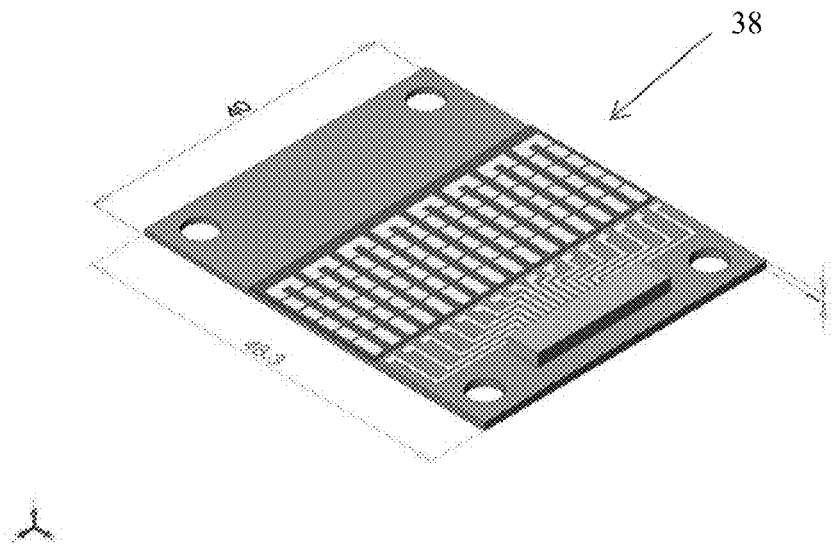
FIG. 8 shows an example of a circuit board that could be used to power and control function of the UV LEDs.
Figure 9:
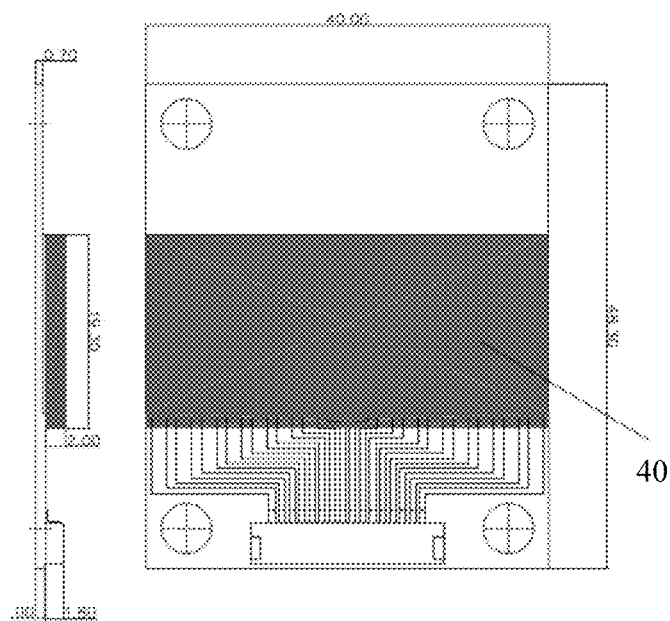
FIG. 9 shows a top view of the circuit board of FIG. 8.
Figure 10:
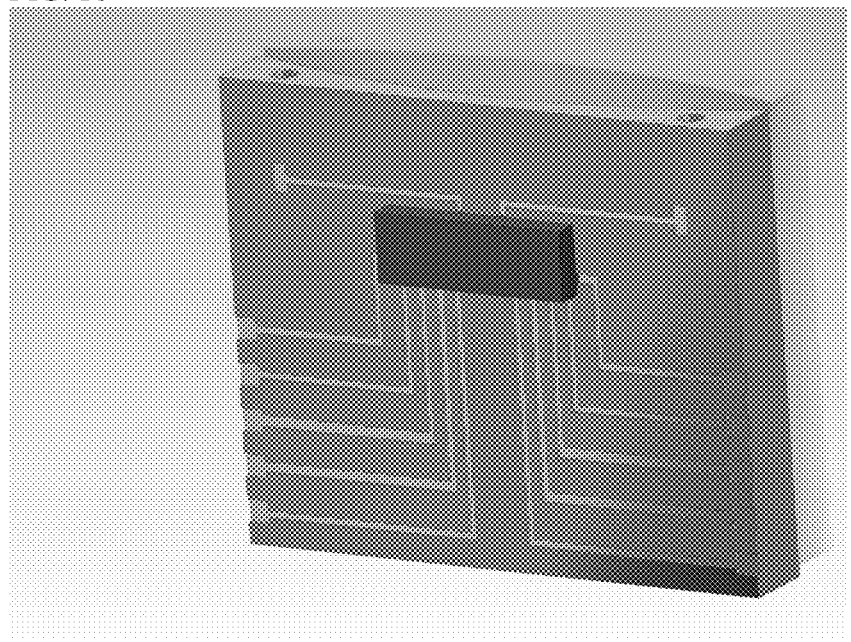
FIG. 10 shows one embodiment of a UV LED chip mount board.

In the embodiment in which the UV LEDs are positioned on a background or board, examples of such systems are illustrated in FIGS. 8-10. FIG. 8 shows a PCB board 38 for power supply to be delivered to the UV LEDs. For example, the board of FIG. 4 may be positioned within the side module 24 in order to deliver power to the system. Alternatively, electrical connections from the UV LEDs or the array of UV LEDs may be extended and connected to the board at a location away from the tube 12, 22. FIG. 9 shows a top plan view of the circuit board of FIG. 8. In this board embodiment, there are eight rows of ten chips each, resulting in eighty chips on the board. Each chip is generally about 1 mm×1 mm with peak wavelength of about 385-390 nm. FIGS. 9 and 10 also show a resin 40, such as a silicone resin, for use as a potting agent (such that the chips and the wires are connected and covered by the silicon resin). The width of the silicone resin layer may be about 2 mm, although any appropriate thickness is possible and considered available for use within the scope of this invention. One benefit of the board 38 shown is that about 64 W of energy is produced by such a small device, which is also very light in comparison to an equivalent UV lamp source. (For aerospace applications, size, volume and weight are of utmost concern.)

Figure 11:
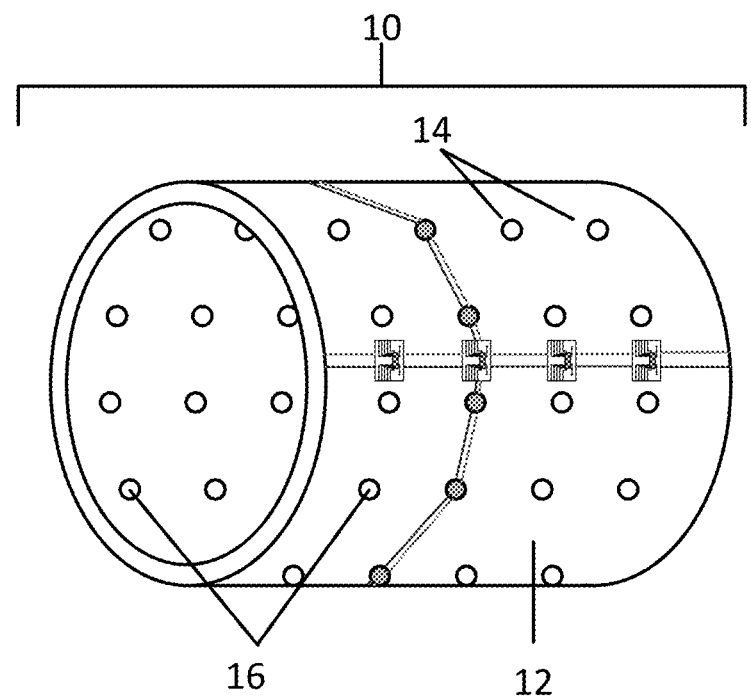
FIG. 11 shows a potential wiring configuration for delivering power to UV LEDs positioned in openings
Figure 12:
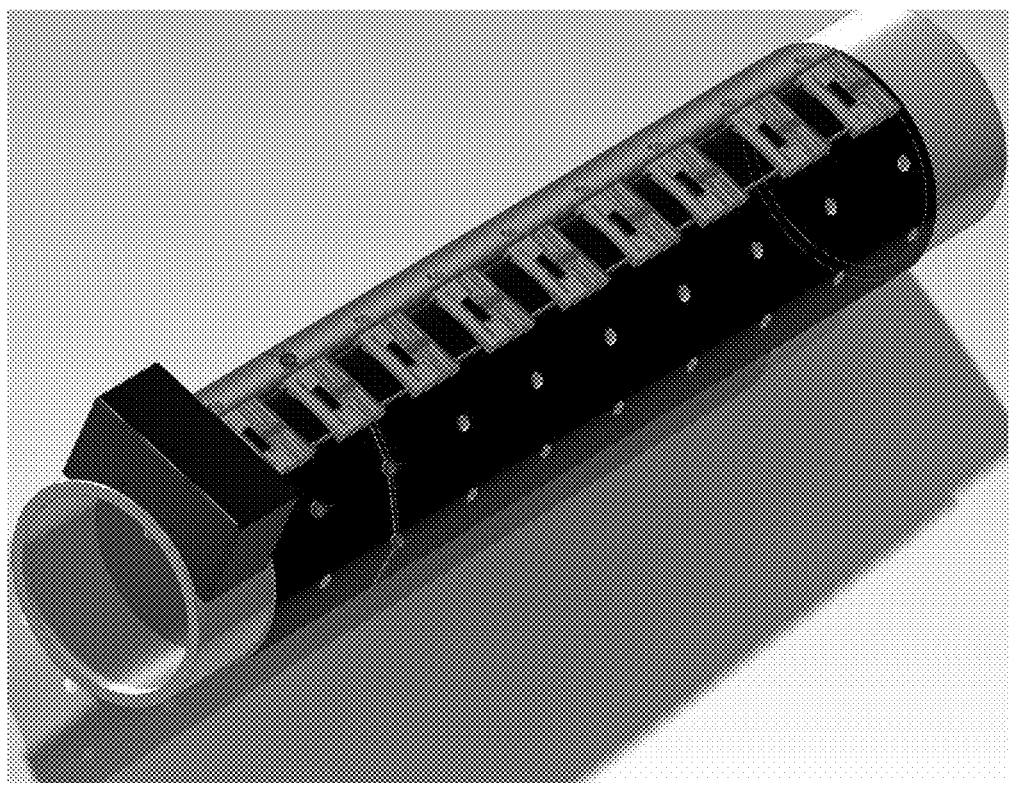
FIG. 12 shows an alternate wiring configuration.

FIGS. 11 and 12 show examples of potential wiring configurations, in order to deliver power to the UV LEDs positioned in openings, positioned on an array board, or anywhere along the inline water tube in accordance with the embodiments described herein.

A further advantage of the embodiments described herein is that the UV LED system is envisioned for use as a system to measure water quality. The UV LEDs may be used to sense the quality of water passing through the line, as an analytical measuring device to determine the water quality (cloudiness/clarity). This can avoid the need for a separate water test at a separate location.

The embodiments described herein provide a number of advantages over the current mercury UV lamp that have been used to treat water on-board passenger vehicles, particularly aircraft, to date. A mercury lamp presents many disadvantages which have been remedied by the implementation of the present UV LED system. The mercury inherent in UV lamps is toxic and could contaminate the module in the case of a break. Additionally, the lamp's configuration requires water to flow around it, which is not as conducive to laminar flow patterns as the present UV LED configuration is. Additionally, if two lamps are used, the size and weight of the system is increased which is clearly disadvantageous on an aircraft, where weight reduction is a primary concern. Lamps also produce a broader spectrum of wavelengths, whereas UV LEDs can be set to emit more precisely at known wavelengths. LEDs also have a longer life span of use before failure and are more reliable when compared to the lamp technology. Lamps have a ramp up/power on time, whereas LEDS have instantaneous start and stop capability. Finally, LEDs use less current while also emitting at a higher power, making them more energy efficient.

Changes and modifications, additions and deletions may be made to the structures and methods recited above and shown in the drawings without departing from the scope or spirit of the invention and the following claims.

What is claimed is:

1. An inline ultraviolet light emitting diode water treatment system, comprising:
    (a) a water supply line;
    (b) a plurality of LED water line tube sections, each comprising a circular cross-section and an opening along a tube section that supports a side module extending away from the opening, the module supporting one or more ultraviolet light emitting diodes, and further comprising a curved lens covering the opening and contouring with the circular cross-section of the tube section, positioned to isolate the one or more ultraviolet light emitting diodes from water flow;
    (c) wherein the plurality of LED water line tube sections are spaced along and help form the water supply line, such that water flowing through the water supply line is treated at multiple locations as it passes the plurality of LED water line tube sections spaced along the water supply line without requiring a pass through a separate water treatment device or chamber; and
    (d) an outer sheath encasing at least a portion of the water line tube sections and configured to insulate and retain heat energy produced by the one or more ultraviolet light emitting diode in order to heat water flowing through the water supply line.

2. The system of claim 1, wherein the one or more ultraviolet light emitting diode is maintained in the side module via adhesive securement with a heat resistant adhesive, mechanically secured via a screw and thread configuration, soldered in place, provided on a fitting, or positioned on a background or plate that is positioned around the water line tube section such that the UV LEDS can shine through openings.

3. The system of claim 1, wherein the side module comprises the UV LEDs in an array that is covered by a lens, and wherein the curved lens is positioned in line with a side of the water line tube section.

4. The system of claim 1, wherein the system is mounted on board a passenger transportation vehicle.

5. The system of claim 1, wherein the system is mounted on board an aircraft.

6. The system of claim 1, wherein the at least one ultraviolet light emitting diode is modular, such that one or more diodes may be removed and replaced.

7. The system of claim 1, wherein the at least one ultraviolet light emitting diode comprises a plurality of ultraviolet light emitting diodes having different wavelengths.

8. The system of claim 1, wherein the at least one ultraviolet light emitting diode emits light at a wavelength of between about 220 nm to about 310 nm.

9. The system of claim 1, wherein the at least one ultraviolet light emitting diode is used to sense the water quality of the water passing though the water supply line.

10. The system of claim 1, wherein the at least one ultraviolet light emitting diode generates heat, and wherein the heat is harnessed to supply heat to the water supply line, to the water line tube sections, or both.

11. The system of claim 1, wherein at least one of the plurality of water line tube sections is configured to be positioned along an existing water line pipe.

12. The system of claim 1, wherein at least one of the plurality of water line tube sections is configured to replace a portion of an existing water supply pipe.

13. The system of claim 1, wherein at least one of the plurality of water line tube sections is configured to be an outer sleeve for a transparent water line pipe.

14. The system of claim 1, further comprising a UV reflective rail member positioned within at least one of the plurality of water line tube sections.

* * * * *